US012267189B2

(12) United States Patent
Korpi et al.

(10) Patent No.: US 12,267,189 B2
(45) Date of Patent: Apr. 1, 2025

(54) NEURAL-NETWORK-BASED RECEIVERS

(71) Applicant: Nokia Technologies Oy, Espoo (FI)

(72) Inventors: Dani Johannes Korpi, Helsinki (FI);
Mikko Aleksi Uusitalo, Helsinki (FI);
Janne Matti Juhani Huttunen, Espoo (FI); Leo Mikko Johannes Karkkainen, Helsinki (FI); Mikko Johannes Honkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/021,631

(22) PCT Filed: Aug. 20, 2020

(86) PCT No.: PCT/EP2020/073424
§ 371 (c)(1),
(2) Date: Feb. 16, 2023

(87) PCT Pub. No.: WO2022/037785
PCT Pub. Date: Feb. 24, 2022

(65) Prior Publication Data
US 2023/0308317 A1 Sep. 28, 2023

(51) Int. Cl.
*H04L 25/03* (2006.01)
*H04B 1/10* (2006.01)

(52) U.S. Cl.
CPC ......... *H04L 25/03165* (2013.01); *H04B 1/10* (2013.01)

(58) Field of Classification Search
CPC .................. H04L 25/03165; H04B 1/10
See application file for complete search history.

(56) References Cited

U.S. PATENT DOCUMENTS

| | | | |
|---|---|---|---|
| 10,552,739 B1 | 2/2020 | Rausch et al. | 706/12 |
| 2018/0365975 A1 | 12/2018 | Xu et al. | 29/185 |
| 2019/0287022 A1 | 9/2019 | Zhang et al. | |
| 2019/0311259 A1 | 10/2019 | Cricri et al. | 3/8 |
| 2020/0177418 A1 | 6/2020 | Hoydis et al. | |
| 2020/0202213 A1 | 6/2020 | Darvish Rouhani et al. | 3/82 |
| 2020/0234143 A1 | 7/2020 | Yoon et al. | 3/88 |
| 2023/0299872 A1* | 9/2023 | Xu | G06N 3/045 370/328 |
| 2023/0308317 A1* | 9/2023 | Korpi | H04B 1/10 |

(Continued)

FOREIGN PATENT DOCUMENTS

| | | |
|---|---|---|
| CN | 110741553 A | 1/2020 |
| CN | 111034230 A | 4/2020 |

(Continued)

*Primary Examiner* — Janice N Tieu
(74) *Attorney, Agent, or Firm* — McCarter & English, LLP

(57) ABSTRACT

In some examples, a node for a telecommunication network includes a neural-network-based receiver for uplink communications. The node is configured to modify the neural-network-based receiver to generate a set of modified receiver frameworks defining respective different versions for the receiver, using each of the modified receiver frameworks, generate respective measures representing bits encoded by a signal received at the node, calculate a value representing a variance of the measures, and on the basis of the value, determine whether to select the signal received at the node for use as part of a training set of data for the neural-network-based receiver.

13 Claims, 4 Drawing Sheets

(56) References Cited

U.S. PATENT DOCUMENTS

2023/0342590 A1* 10/2023 O'Shea .................. G06N 3/09
2023/0362042 A1* 11/2023 Honkala ........... H04L 27/26134

FOREIGN PATENT DOCUMENTS

| CN | 111327367 A | 6/2020 |
| CN | 111512323 A | 8/2020 |
| CN | 111542843 A | 8/2020 |
| EP | 3633944 A1 | 4/2020 |

* cited by examiner

NEURAL-NETWORK-BASED RECEIVERS

CROSS REFERENCE TO RELATED APPLICATION

This patent application is a U.S. National Stage application of International Patent Application Number PCT/EP2020/073424 filed Aug. 20, 2020, which is hereby incorporated by reference in its entirety.

TECHNICAL FIELD

Aspects relate, in general, to telecommunication networks, and more specifically, although not exclusively to neural-network-based receivers.

BACKGROUND

In a simple representation, a wireless telecommunication network comprises a sending side and a receiving side with a wireless channel in between them. The sending side usually consists of a data source which generates data (bits) and a modulation system comprising a carrier which is modulated by the data to provide an output signal. The output of the sending side (the output signal) is sent over the channel to the receiving side. Generally speaking, the channel corrupts the transmitted output signal with noise and any interference that might be exhibited due to adverse channel conditions.

A receiver on the receiving side can be used to demodulate the signal received over the channel from the sending side for data recovery. The receiver is generally configured to demodulate received signals based on an algorithm for channel estimation, equalization, symbol detection, and so on that is preconfigured prior to deployment of the receiver in the network. As such, the receiver, whilst being able to demodulate a proportion of received signals from the sending side of the network, can fail to demodulate all signals due to the prevailing channel conditions which can corrupt the output signal.

SUMMARY

According to an example, there is provided a node for a telecommunication network, the node comprising a neural-network-based receiver for uplink communications, wherein the node is configured to modify the neural-network-based receiver to generate a set of modified receiver frameworks defining respective different versions for the receiver, using each of the modified receiver frameworks, generate respective measures representing bits encoded by a signal received at the node, calculate a value representing a variance of the measures, and on the basis of the value, determine whether to select the signal received at the node for use as part of a training set of data for the neural-network-based receiver.

Accordingly, a NN-based receiver can be trained and calibrated after deployment. This enables the NN-based receiver to tailor its operation to the prevailing environment. If a signal received at the receiver is similar to samples used in training data, the model may confidently detect the bits encoded by the received signal waveform and there will be a low uncertainty. However, if a sample is very different from the samples presented in the training data, the model has to extrapolate and there is usually a high model uncertainty. Such model uncertainty can be captured by receiving a given waveform with several randomly manipulated versions of the neural network that underpins a NN-based receiver in the network node, and using these to calculate the variance of the detected bits. High variance implies high model uncertainty. Note that this variance/uncertainty is different from the detection uncertainty, which is caused by a noisy information channel. Put another way, model uncertainty is the uncertainty of the detection uncertainty. Thus, collected data can be used in the cloud to retrain a NN-based receiver that is configured in a similar way to the deployed receiver with the exact amount of data being used required depending on the NN architecture.

The neural-network-based receiver can be modified by applying dropout masks. The node can compare the value representing the variance with a threshold value. The node can receive data representing the threshold value, and use the threshold value to regulate selection of the signal received at the node for use as part of the training set of data. In an example, the respective measures are log-likelihood ratio values, LLRs.

The node can compute a measure of variance of multiple LLR values stored in a temporary storage of the node, and determine a median value of the variance. In an example, the neural-network-based receiver is a radio receiver.

According to an example, there is provided a method for selecting a training sample for a neural-network-based receiver configured for uplink communications in a selected deployment environment of a telecommunication network, the method comprising generating multiple measures representing bits encoded by a signal received at the receiver using respective different neural-network-based receiver frameworks, calculating a variance of the measures, and on the basis of a comparison of the variance to a threshold value, determining whether to select the signal received at the receiver as part of a training data set. The method can further comprise applying randomised dropout masks to a neural-network-based receiver deployed in the selected environment in order to generate the different neural-network-based receiver frameworks. The method can further comprise receiving the threshold value from a core network entity of the telecommunication network. The method can further comprise transmitting the signal received at the receiver and the multiple measures to a core network entity of the telecommunication network. The multiple measures can be LLR values.

According to an example, there is provided a network entity for a telecommunication network, the network entity configured to receive a signal and a set of corresponding data bits from a node of a telecommunication network, train a neural-network-based receiver configured for uplink communications for the node using the signal and the set of corresponding data bits, determine a measure representing a degree of overfit for the model, and on the basis of the measure, provide an updated neural-network-based receiver to the node or generate a request for additional data from the node. The network entity can modify a threshold value on the basis of the measure, and transmit the modified threshold value to the node. The network entity can determine a backhaul capacity relating to the node, and on the basis of the determined backhaul capacity, determine the measure representing a degree of overfit for the model. In an example, the network entity can be in the form of a cloud-based training entity configured to receive training data uploaded by a network node, such as a node described herein.

BRIEF DESCRIPTION OF THE DRAWINGS

For a more illustrative understanding of the present disclosure, reference is now made, by way of example only, to the following descriptions taken in conjunction with the accompanying drawings, in which.

DESCRIPTION

Figure 1:
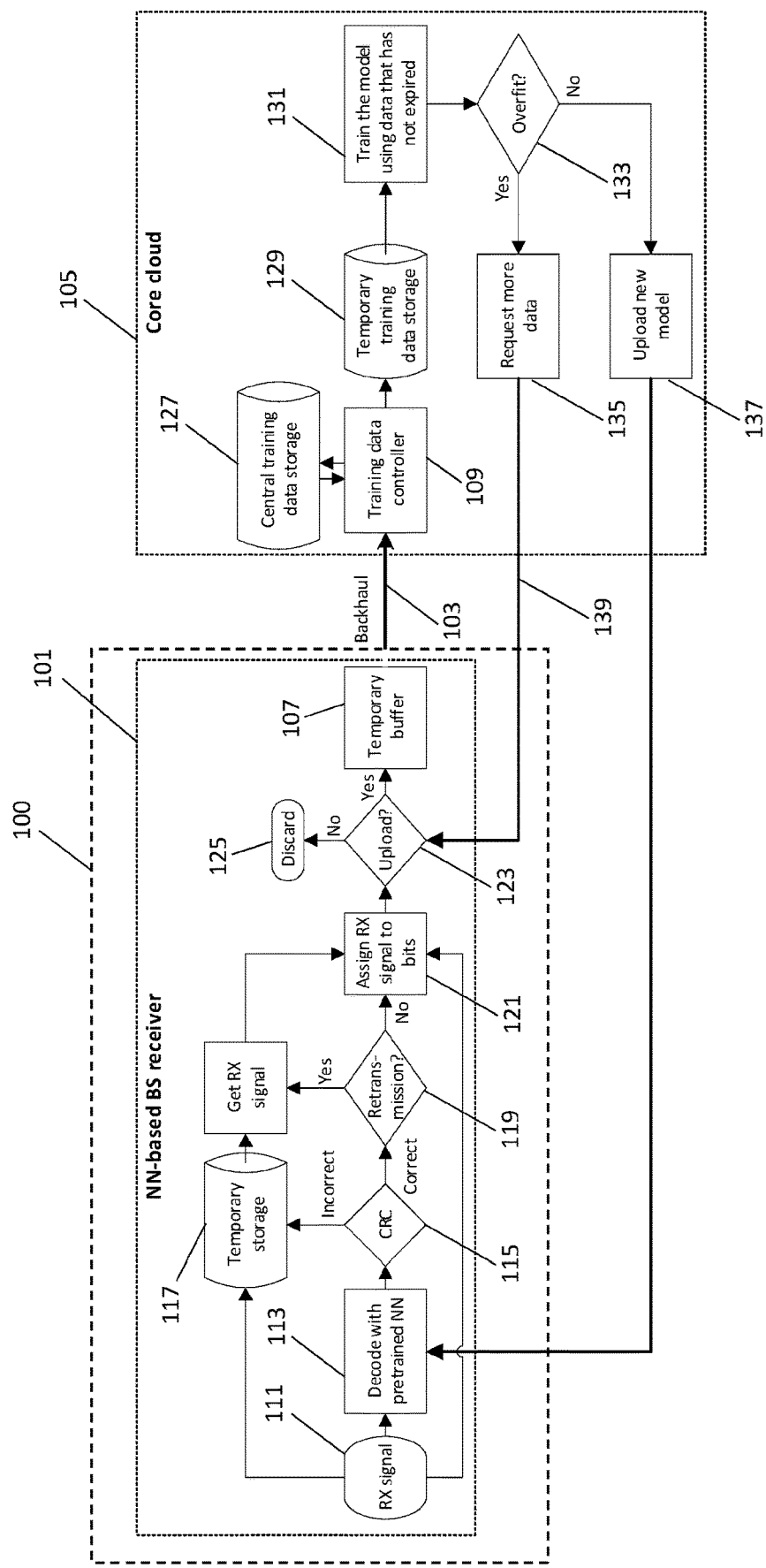
FIG. 1 is a schematic representation of a node for a telecommunication network, according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Recent advances in deep learning in areas such as natural language processing, image processing, autonomous driving, and so on have prompted interest in their use in the domain of communication signal processing. For example, deep neural networks (DNN) can be used to perform detailed waveform classification, and it is possible to implement a digital receiver chain of a receiver in a telecommunication network using neural networks (NNs). As such, explicit algorithms for channel estimation, equalization, symbol detection, and demodulation for example need not be implemented, and a NN-based receiver can be trained prior to deployment with simulated (or real) data to enable it to perform operations implicitly.

Nevertheless, performance of a NN-based receiver would be improved if it could specialize its operation according to the channel conditions in the region of deployment since conditions can vary dramatically from one deployment location to another. However, in order to do so, a NN-based receiver would need to be retrained in the field in order to adjust to the prevailing channel conditions. This may introduce the need for extra hardware in a network node in which the NN-based receiver is implemented. Since the cost efficiency of radio components in such nodes is tightly controlled, this is not desirable. Furthermore, bandwidth in the backhaul link of the network is very limited as actual data traffic must be given priority. This therefore means that a node will generally be unable to send training data to the degree required to enable a sufficiently trained model to be provided.

Therefore, although it is desirable to be able to tailor a NN-based receiver to the conditions experienced in a location of deployment, it is problematic to be able select, collect, and transfer only essential data from the specific environment, use this data to retrain the NN-receiver, and then upload the new model to the node. Moreover, this must be done in a scalable manner.

According to an example, there is provided a node for a telecommunication network. The node comprises a neural-network-based receiver for uplink communications. Operation of the NN-based receiver can be tailored to the prevailing channel, interference, and traffic statistics in the deployment environment of the node. As such, in an example, the NN-based receiver can be preconfigured with a non-location-specific reception model. Such an initial model can be configured to deal with common non-location specific reception scenarios, whilst location-specific phenomena can be learnt autonomously using field data.

In an implementation, a deployed NN-based receiver can collect a proportion of received waveforms along with their corresponding bits for the purposes of model training. For example, a predefined proportion, such as a percentage (e.g., 1%) of signal waveforms received by the NN-based receiver can be stored as samples.

A component of these samples can be chosen based on a random selection (forming a dataset $D_{random}$), whilst another component can comprise samples which have a high modelling uncertainty (forming dataset $D_{uncertain}$). In an example, samples which have a high modelling uncertainty can, generally speaking, refer to received waveforms which somehow differ from those represented in earlier training data. That is, it may be possible that an NN-based receiver can detect such a signal accurately enough to facilitate successful decoding, but such detection may have been, for example, 'lucky' and based on extrapolation if the signal was not something previously provided in training data for the NN-based receiver. Alternatively, the neural network might perform poorly for such signals but still achieve sufficient accuracy for the decoder to correct all bit errors.

According to an example, there is uncertainty that is related to how well a bit can be detected from a noisy signal. In an NN-based receiver, this uncertainty can be presented in the log-likelihood ratio (LLR) values and may be referred to as "detection uncertainty". Factors such as noise level have influence on this uncertainty. On the other hand, there is another type of uncertainty (which may be referred to as "model uncertainty") which defines how well prepared a model is to enable detection of a signal. For instance, if a signal sample is similar to samples in training data, the model may confidently detect the bits encoded by the received signal waveform and there will be a low uncertainty. However, if a sample is very different from the samples presented in the training data, the model has to extrapolate and there is usually a high model uncertainty. Such uncertainty can be inferred using, for example, ensemble or variational methods.

In an example, this model uncertainty can be captured by receiving a given waveform with several randomly manipulated versions of the neural network that underpins a NN-based receiver in a node of a network, and calculating the variance of the detected bits. High variance implies high model uncertainty. Note that this variance/uncertainty is different from the detection uncertainty, which is caused by a noisy information channel. Put another way, model uncertainty is the uncertainty of the detection uncertainty.

Collected data can be used in the cloud to retrain a NN-based receiver that is configured in a similar way to the deployed receiver with the exact amount of data being used required depending on the NN architecture. More data can be requested from the receiver deployed in the node in the event that the cloud-based version overfits to the data, which can be determined using any one of the normal procedures for overfit detection. The cloud-based version that has been trained with a sufficient amount of data from the deployment environment can be uploaded to the node to replace the initial NN-based receiver in order to improve detection performance. Accordingly, a NN-based receiver can be trained and calibrated after deployment. This enables the NN-based receiver to tailor its operation to the prevailing environment.

FIG. 1 is a schematic representation of a node for a telecommunication network, according to an example. Node 100 comprises a NN-based receiver 101. A backhaul link 103 is provided between the node 100 and a network entity, such as a cloud component 105 of the core of the telecommunication network. In an example, the backhaul link 103 can be used to send data from a temporary buffer 107 of the NN-based receiver 101 to a training data controller 109 of the component 105. In the example of FIG. 1, the NN-based receiver 101 is configured to receive signals 111. The signals 111 can be received from, for example, user equipment operating in the telecommunication network. A received signal 111 is decoded using a pre-trained NN model 113. That is, data in the form of bits that has been used to modulate a carrier signal is received by NN-based receiver 101 and decoded using the NN 113 in order to recover the data. The received signal 111 can be stored in a temporary storage 117 of the NN-based receiver 101.

As noted above, channel conditions can corrupt the signal 111 such that the decoded data is not the same as the data that was sent. A cyclic redundancy check (CRC) 115 can be performed in order to determine if errors are present.

If the result of the CRC indicates a decoding error, the result of the CRC can be stored in the temporary storage 117 of the NN-based receiver 101 and associated with the corresponding signal 111. If the CRC indicates correct decoding, the NN-based receiver 101 can determine (119) whether the signal 111 that resulted in the correct CRC was a retransmission or not. If it was a retransmission, the signal 111 can be retrieved from the temporary storage 117 and assigned (121) to the decoded data bits encoded by the signal 111. That is, a signal that is not decodable from the first transmission can be stored in temporary storage 117 whilst waiting for the retransmission of the corresponding packet.

Once it has been retransmitted and successfully decoded, the final bits can be associated with the initial signal. Accordingly, poorly detected signals, which are desirable for the NN-based receiver 101 to be able to detect more accurately, are used to improve the performance of the NN-based receiver.

As will be described in more detail below, the NN-based receiver 101 can determine (123) whether to upload the signal 111 and corresponding decoded data bits to the component 105. If not uploaded, they may be dismissed (125). Otherwise, they can be provided to the temporary buffer 107 to be sent over the backhaul 103 to the training data controller 109 of the component 105. In the example of FIG. 1, the training data controller 109 can communicate with a training data storage 127, which can store training data that can be used to train an NN model for decoding signals 111. In the example of FIG. 1, the data from temporary buffer 107 can be stored in storage 127 and the controller 109 can retrieve such data and provide it to a temporary training data storage 129 where, providing it is not older than a preselected threshold, it can be used to train (131) the aforementioned model.

The component 105 can determine (133) whether the model overfits to the training data. If there is no overfitting, the model can be uploaded 137 to the node 100 and therefore form an updated version of the pretrained NN 113 for the NN-based receiver 101. If there is overfitting, more data can be requested (135) from the node 100. In the example of FIG. 1, the request for more data can inform a decision at the NN-based receiver 101 as to whether to upload (123) data to component 105. As such, the result of a determination on overfitting (133), indicating overfit can result in a request for data 135 being sent (139) to node 100.

To generate the training data from its own deployment environment, node 101 can use different types of data, thereby enabling it to have a sufficient variability in the training data. According to an example, and as described above with reference to FIG. 1, node 100 can randomly save a certain proportion of the RX signals 111 and combine these with the decoded bits, which form labels for the signals. In an alternative implementation, the encoded bits can be used as the labels, and the NN-based receiver 101 can output, for example, LLRs which can be decoded with legacy LDPC decoders.

The proportion of saved data (in comparison to an overall amount of received data at node 100) can be of the order of 1-5%, to avoid congesting the backhaul link 103 when transferring data to the cloud component 105.

According to an example, node 100 can collect data that is not decodable with, e.g., a first transmission. As described with reference to FIG. 1, this can be done by keeping a non-decodable RX signal 111 in a buffer (117) whilst waiting for the retransmission of the corresponding packet. Once it has been retransmitted and successfully decoded, such as with the help of HARQ for example, the final bits can be associated with the initial RX signal and potentially uploaded to the cloud component 105. This enables the performance of the NN-based receiver 1010 to be improved, since these poorly detected signals are the ones that the NN should ideally be able to detect more accurately as they are likely a result of the channel conditions that are experienced as a result of the deployment environment of the node 100.

In an example, data uploaded to component 105 for training can comprise both of the aforementioned cases, whereby to ensure balanced representation of low-SINR and high-SINK data samples. This randomly generated training dataset is referred to herein as $D_{random}$.

In addition, node 100 can save samples that are decoded with large model uncertainty. This can be performed with a small portion of the data samples. A dataset with such uncertain samples is referred to as $D_{uncertain}$. Model uncertainty prediction can be carried out in the node 100, but no training is necessary at the node 100. Even though the NN 113 outputs (log) likelihood ratios (LLRs), these essentially describe the effect of noise/interference, not the uncertainty of the model itself. According to an example, estimates of model uncertainty can be calculated using variational inference or by way of an ensemble of models. For example, dropouts can be applied during training, which is a regularization method to reduce overfitting. In dropout, at each training step, a portion of the model activations are randomly dropped out (i.e. set to zero). However, dropout is a form of variational inference and therefore model uncertainty can be calculated by applying dropout during inference. Therefore, this method can be applied at the node 100 even though the training itself is carried out centrally in the core cloud 105.

Consequently, according to an example, the modelling uncertainty for the $i^{th}$ subcarrier on the $j^{th}$ OFDM symbol can be expressed as:

$$\delta_{ij}^2 = \frac{1}{N_s} \sum_{n=0}^{N_s-1} (LLR_{i,j,n} - \mu_{ij})^2$$

where $LLR_{ij,n}$ refers to n'th sample of LLRs computed either using randomly dropped activations (dropout) or using the n'th model (in an ensemble of models), and $N_s$ is the number of dropout/ensemble of model samples and $\mu_{ij}$ is the mean ($\mu_{ij} = 1/N_s \sum_{n=0}^{N_s-1} LLR_{ij,n}$).

From this, the samples to be backhauled for inclusion to the dataset $D_{uncertain}$ can be determined by those samples fulfilling the criterion:

median($\delta_{ij}$)>$\delta_{threshold}$ where the median is calculated over all the indices i and j in the TTI, and $\delta_{threshold}$ is a selected threshold value.

Figure 2:
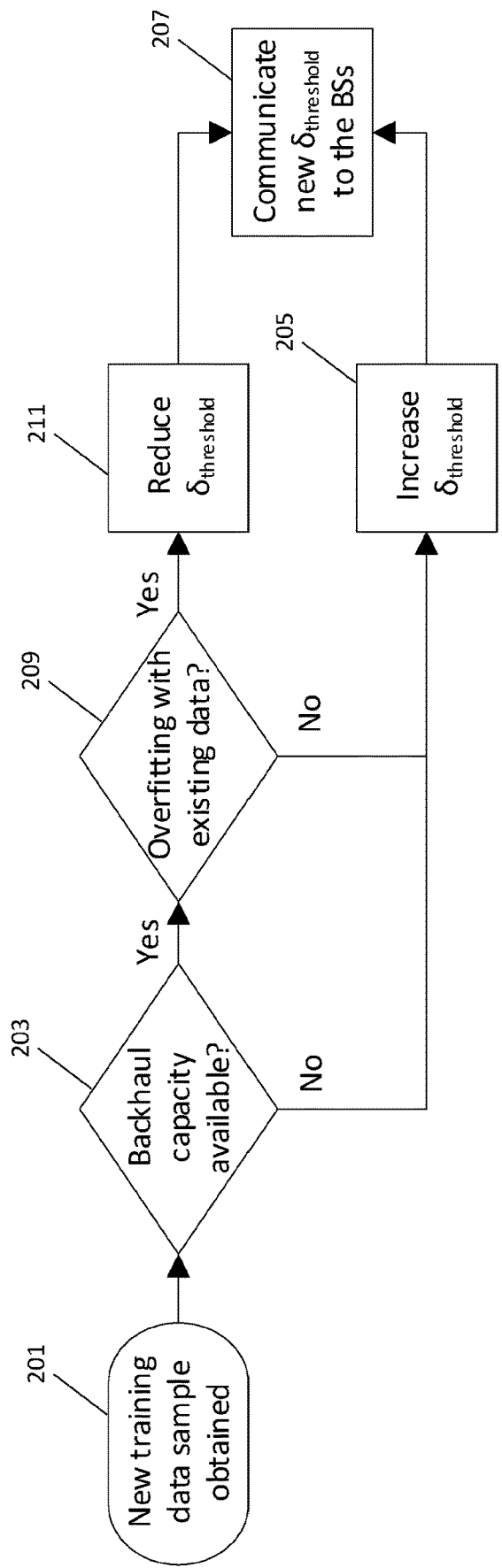
FIG. 2 is a schematic representation of a method to select $\delta_{threshold}$ according to an example.

FIG. 2 is a schematic representation of a method to select $\delta_{threshold}$ according to an example. In an example, the threshold calculation can be performed in the central core component 105, which then forwards the threshold value to the node 101.

In block 201, a new training data sample is obtained at the training data controller 109 from the node 100 via backhaul 103. In block 203, component 105 determines whether backhaul 103 capacity exists between the component 105 and node 100. If it is determined that there is no available backhaul capacity, the value of $\delta_{threshold}$ is increased in block 205 and the increased value is communicated to node 100 in block 207. If, in block 203, component 105 determines that backhaul capacity exists between the component 105 and node 100, it is determined in block 209 whether the existing model is overfitting using the present data. If not, the value of $\delta_{threshold}$ is increased in block 205 and the increased value is communication to node 100 in block 207. If overfit is occurring, the value of $\delta_{threshold}$ is reduced in block 211 and the reduced value is communication to node 100 in block 207. Thus, in the example of FIG. 2, a model uncertainty threshold for data collection can be determined in the core component 105 and communicated to the node 100 in order to regulate the transmission of training data from the node 100 to the component 105 over the backhaul 103. Accordingly, the threshold is increased to reduce the amount of training data that is transferred. In an example, this is done when there are less backhaul resources and/or if the model does not overfit anymore.

Figure 3:
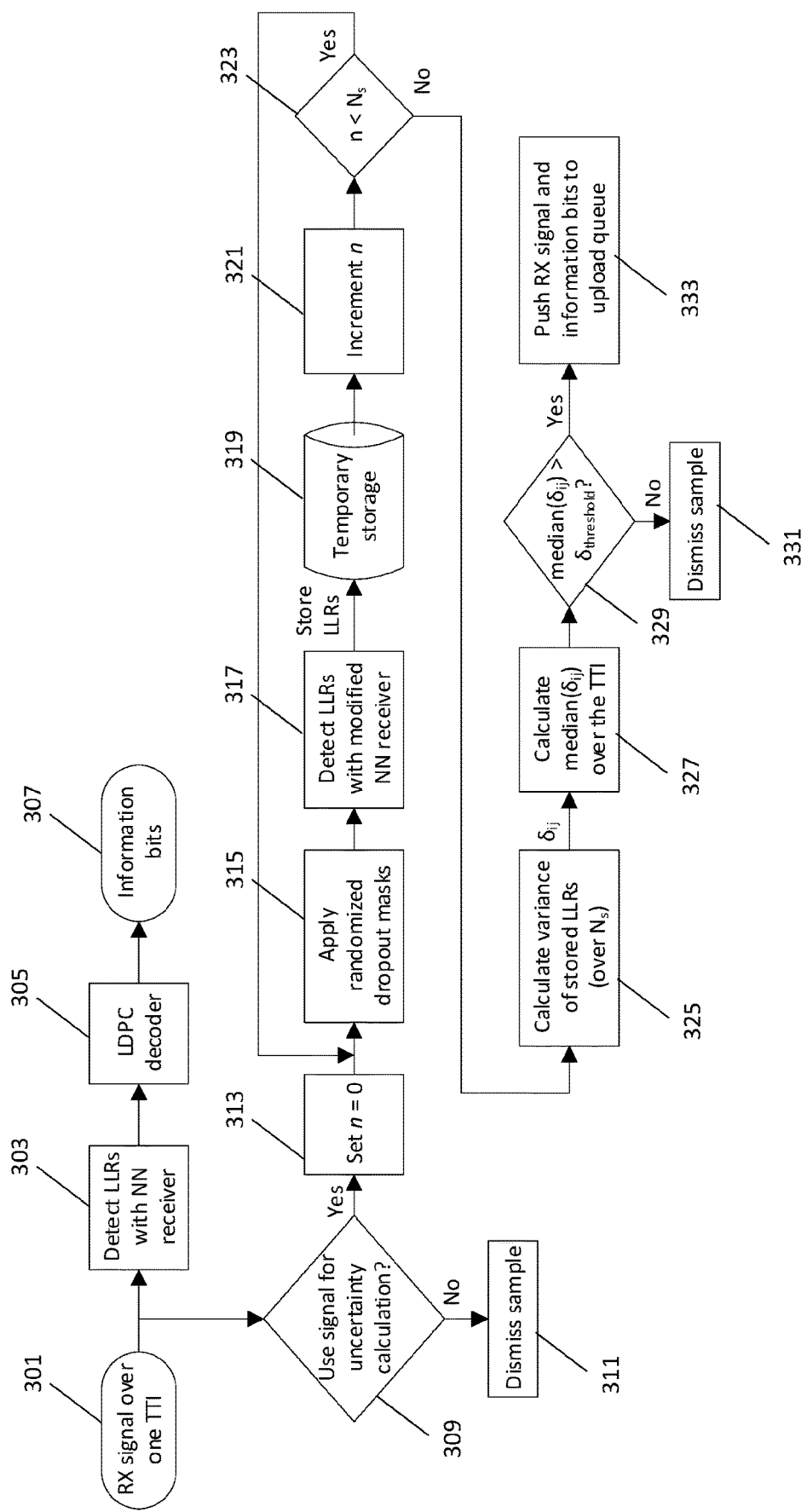
FIG. 3 is a schematic representation of a process for data selection according to an example.

FIG. 3 is a schematic representation of a process for data selection according to an example. In particular, FIG. 3 is a process for uncertainty calculation and data selection at a node of a telecommunication network, such as node 100 for example. In the example of FIG. 3, the process may be implemented in block 123 of node 100, described above with reference to FIG. 1. The process of FIG. 3, implemented (at least in part) in block 123 of node 100 defines a procedure for determining if an individual TTI should be added to the dataset $D_{uncertain}$. The initial criterion for using the signal for uncertainty calculation can be based on a random selection (e.g., 1% of data), or the uncertainty calculation can be done at fixed intervals. In the example of FIG. 3, the procedure represents the case where a signal can be decoded without a retransmission. The procedure is essentially similar for the case where a retransmission is required, but it is not included in the figure for simplicity and readability. In an example, retransmissions can be used to determine the correct information bits (which are used as labels during the training), but the LLRs for the uncertainty calculation can be obtained using the initial transmission.

With reference to FIG. 3, in block 301 a signal 111 is received at node 100, e.g. over one transmission time interval (TTI). In block 303 LLRs are detected from the signal received at 301 using the NN decoder 113. A low-density parity-check (LDPC) is performed in block 305 and data bits 307 that were encoded by the signal 111 are determined. In block 309, a determination is made as to whether to use the signal 11 for an uncertainty calculation. As noted above, a predefined proportion of signals may be selected, e.g., at random. If the signal is not selected in block 309 it is dismissed (311) for the purposes of uncertainty calculation.

If the signal 111 is selected in block 309 a counter is set to zero in block 313. In block 315, randomised dropout masks are applied to the NN model 113 of the NN-based receiver 101 to generate a set of modified receiver frameworks defining respective different versions for the receiver 101. More particularly, the dropout masks enable a set of NN models 113 to be generated, each of which can be used in block 317 to generate respective measures representing bits encoded by the signal 111 received at the node 100. In an example, the measures can comprise LLRs. The measures are stored in a temporary storage 319, and the counter is incremented in block 321. In block 323 a check is performed to determine whether the so incremented counter is less than $N_s$ (the number of dropout/ensemble of model samples). If it is, the process as described from block 315 repeats. Otherwise, in block 325, a value representing a variance of the measures is calculated. For example, the variance of the LLRs in storage 319 (over $N_s$) can be calculated. From this, the median($\delta_{ij}$) is calculated over the TTI in block 327 and this value is then compared (in block 329) withthreshold $\delta_{threshold}$. If median($\delta_{ij}$)>$\delta_{threshold}$ threshold the signal 111 and the corresponding data bits 307 can be uploaded to the training data controller 109 over the backhaul 103. Otherwise, in block 331, the sample can be dismissed. Thus, node 100 is able to determine, on the basis of the value representing a variance of the measure, whether to select the signal received at the node for use as part of a training set of data for the neural-network-based receiver 101.

Whenever the node 100 selects a particular transport block (the sample) to be part of the training data set (either by random sampling or due to the uncertainty criterion), the corresponding RX signal 111 and the information bits 307 are thus moved to the upload buffer 107. From there, they are transferred to the core cloud component 105. In an example, the transfer can be low priority, as the transfer of the training data is not latency critical.

According to an example, backhauling capacity that is available can be reflected in the proportion of data that is chosen to be uploaded for training. For example, with more backhaul capacity, the necessary data for NN retraining can be collected faster according to the decision flow of FIG. 2, which is beneficial for node performance. Also, and as shown in FIG. 1 and discussed in more detail below, component 105 can have an active role in deciding when and how much data should be uploaded. In addition, the proportion of data used for training can be adjusted based on the time since deployment of a node. For example, a newly deployed NN-based receiver will have a more urgent requirement for an updated model to improve performance, whilst a more mature NN-based receiver may be closer to optimal performance such that slower data collection suffices.

With reference to FIGS. 1 to 3, a training procedure can therefore be seen to be carried out using a network entity such as the cloud component 105. Accordingly, the known hardware limitations of nodes 100 are not an issue since the cloud-training entity 105 receives training data uploaded by the node 100, where it is first fed to a training data controller 109 while maintaining the separation between the two datasets $D_{random}$ and $D_{uncertain}$. The training data controller 109 produces the total training dataset by sampling randomly from $D_{random}$ and $D_{uncertain}$, also including data samples stored earlier into the database 127. However, in an example, newly collected field data can be over-represented in the total dataset to make sure that the NN-based receiver 101 is specialized to the prevailing environment. This can be done by specifying a fixed time window within which the data must have been collected to be included in the training set. Hence, any data older than this is considered to have expired and will not be used for training.

Such a combined training data set is fed to the temporary storage 129, where it is held until training resources become available at component 105. In an example, model training can be performed using a number of procedures, depending on the NN architecture (e.g., backpropagation with Adam optimization). After the training is finished, it is determined (block 133) whether the NN has been overfit to the training data. The overfitting can be detected by validating the trained NN using a separate validation set. The validation set can be formed randomly from those samples of the dataset $D_{random}$ that have not been used for training. This ensures that the validation data is representative of the typical scenarios encountered by the NN when deployed. If overfit has occurred, more data is requested (135) from the node 100 to extend the training data set. In an exceptional case that the link 139 between the node 100 and network core component 105 is congested or temporarily disconnected, it is also possible to request more data from a central database, if available.

Once the NN is deemed to have generalized to the data, and it has demonstrated higher performance than the deployed NN receiver, it can be uploaded (137) to the node 100. Performance can be measured by calculating an uncoded bit error rate (BER) using a portion of the data that has not been used, either during training or during validation (for overfit detection). This data can also be taken from the dataset $D_{random}$. Once the performance of the newly trained NN is higher than that of the deployed receiver 101 on the same data, this indicates that it is ready for deployment.

According to an example, one approach is to compare the average BERs using a comparison metric:

$$\gamma_{NN} = \frac{1}{N_{eval}} \sum_{n=0}^{N_{eval}-1} BER_n$$

where $N_{eval}$ is the number of TTIs used for the performance evaluation, and $BER_n$ is the achieved uncoded BER of the nth TTI.

However, in some situations, this metric can emphasize a low-SNR region, favouring NNs that are excellent with low SNRs but that do not necessarily perform well on the high SNRs. In an example, the geometric mean can therefore also be calculated and used as a comparison metric (by replacing the zeros with a value that is smaller than the smallest observable BER).

In this case, the comparison metric becomes:

$$\gamma_{NN} = \frac{1}{N_{eval}} \sum_{n=0}^{N_{eval}-1} \log\left(\max\left(\frac{1}{2n_{b,\max}}, BER_n\right)\right)$$

where $n_{b,max}$ is the number of bits in a single TTI with the maximum number of subcarriers and the highest-order modulation and coding scheme.

In an example, transfer of a newly trained NN model can be performed at times of low activity, e.g., at night, or during a service break, in order to avoid loss of service for subscribers. Once the new model executes at the node 100, it is also possible to start training a new model in the cloud component 105, whose performance can be compared to the deployed model. The new model can be trained in a similar manner by feeding it data from the central database, emphasizing up-to-date data from the node 100. Once it is observed that the new model candidate achieves a higher performance than the deployed model, it can be uploaded to the node 100 to replace the old model.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, SOC 123) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 4:
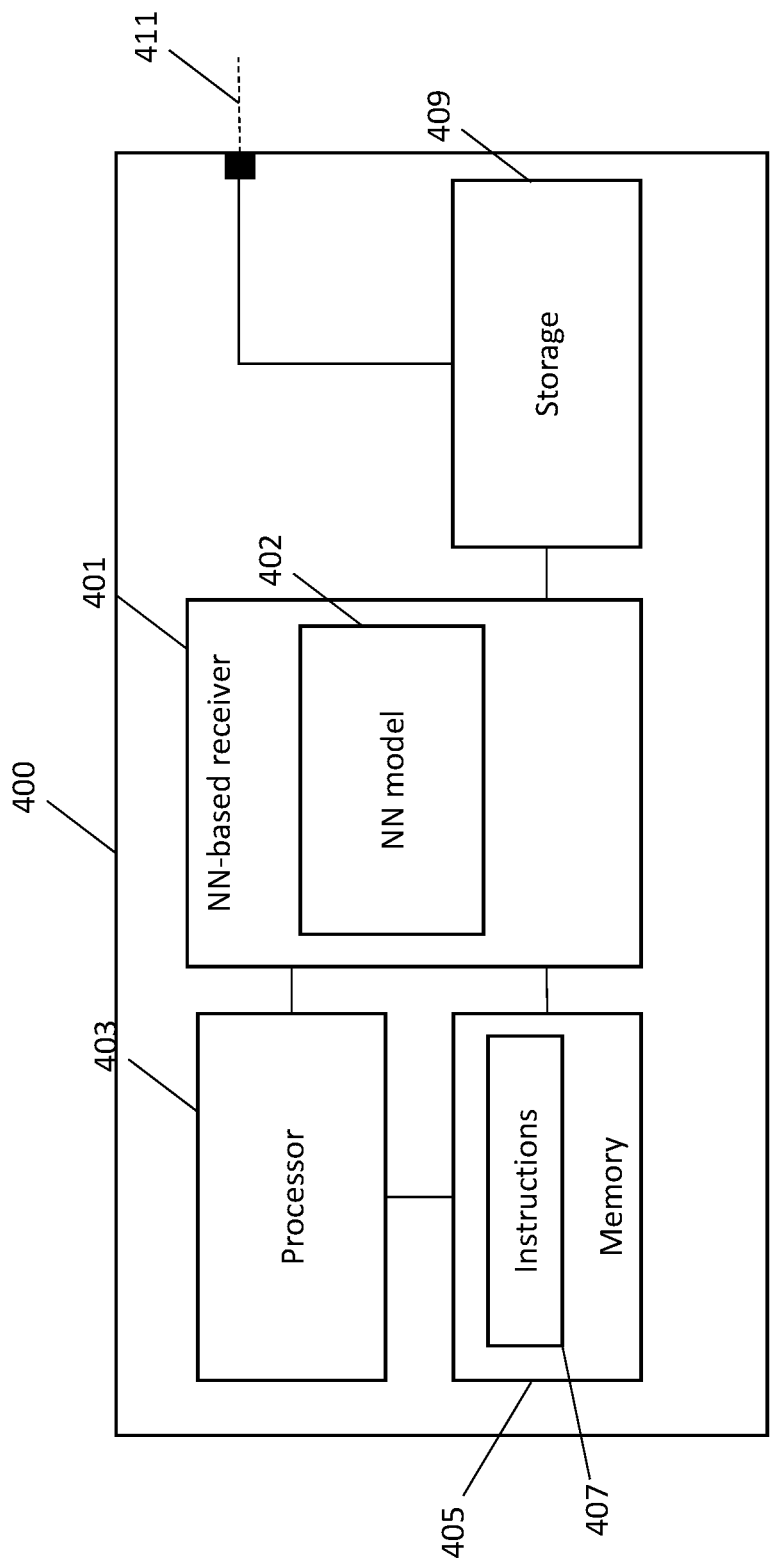
FIG. 4 is a schematic representation of a node according to an example.

FIG. 4 is a schematic representation of a node according to an example. Node 400 comprises a NN-based receiver 401. NN-based receiver 401 comprises a NN model 402, such as 113 of FIGS. 1 and 303 of FIG. 3. Node 400 further comprises a processor 403 and a memory 405 storing instructions 407. Temporary storage 409 can be provided for node 400. The temporary storage 409 can send data over backhaul 411, e.g. to a network core component 105.

The instructions 407 are executable by the processor 403. The instructions 407 can comprise instructions to: generate multiple measures representing bits encoded by a signal received at the receiver 401 using respective different neural-network-based receiver frameworks, calculate a variance 25 of the measures 317, and on the basis of a comparison of the variance to a threshold value, determine whether to select the signal received at the receiver 401 as part of a training data set. Accordingly, the node can implement a method for selecting a training sample for a neural-network-based receiver 401 configured for uplink communications in a selected deployment environment of a telecommunication network.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

The invention claimed is:

1. A node for a telecommunication network, the node comprising a neural-network-based receiver for uplink communications, wherein the node comprises:
at least one processor; and
at least one memory storing instructions that, when executed with the at least one processor, cause the node to:
modify the neural-network-based receiver for uplink communication in the node, to generate a set of modified receiver frameworks defining respective different versions for the neural-network-based receiver;
using the set of modified receiver frameworks, generate respective measures representing bits encoded with a signal received at the node;
calculate a value representing a variance of the respective measures; and
on a basis of the value, determine to select the signal received at the node for use as part of a training data set for the neural-network-based receiver; and
send the signal and a set of corresponding data bits as at least part of the training data set from the node toward a network entity.

2. The node as claimed in claim 1, wherein the neural-network-based receiver is modified with applying dropout masks.

3. The node as claimed in claim 1, wherein the instructions, when executed with the at least one processor, cause the node to compare the value representing the variance with a threshold value.

4. The node as claimed in claim 3, wherein the instructions, when executed with the at least one processor, cause the node to receive data representing the threshold value, and to use the threshold value to regulate selection of the signal received at the node for use as part of the training data set.

5. The node as claimed in claim 1, wherein the respective measures are loglikelihood ratio values.

6. The node as claimed in claim 5, wherein the instructions, when executed with the at least one processor, cause the node to:
compute a measure of variance of multiple loglikelihood ratio values stored in a temporary storage of the node; and
determine a median value of the variance.

7. The node as claimed in claim 1, wherein the neural-network-based receiver comprises a radio receiver.

8. A method for selecting a signal as part of training data set for a neural-network-based receiver configured for uplink communications in a selected deployment environment of a telecommunication network, the method comprising:
generating multiple measures representing data bits encoded with a signal received at the neural-network-based receiver, configured for the uplink communications, using respective different neural-network-based receiver frameworks;
calculating a variance of the multiple measures;
on a basis of a comparison of the variance to a threshold value, determining to select the signal received at the neural-network-based receiver as part of a training data set; and
sending the signal and a set of corresponding data bits as at least part of the training data set toward a network entity.

9. The method as claimed in claim 8, further comprising:
applying randomised dropout masks to the neural-network-based receiver deployed in the deployment environment in order to generate the respective different neural-network-based receiver frameworks.

10. The method as claimed in claim 8, further comprising:
receiving the threshold value from a core network entity of the telecommunication network.

11. The method as claimed in claim 8, further comprising:
transmitting the signal received at the neural-network-based receiver and the multiple measures to a core network entity of the telecommunication network.

12. The method as claimed in claim 8, wherein the multiple measures are loglikelihood ratio values.

13. A non-transitory program storage device readable by an apparatus, tangibly embodying a program of instructions executable with the apparatus for performing the method of claim 8.

\* \* \* \* \*